(12) United States Patent
Agrawal et al.

(10) Patent No.: US 12,500,979 B2
(45) Date of Patent: Dec. 16, 2025

(54) INTERACTIVE TELEPHONE SYSTEM NAVIGATION

(71) Applicant: Motorola Mobility LLC, Chicago, IL (US)

(72) Inventors: Amit Kumar Agrawal, Bangalore (IN); Sanjeev Kumar Poluru Venkata, Bangalore (IN)

(73) Assignee: Motorola Mobility LLC, Chicago, IL (US)

( * ) Notice: Subject to any disclaimer, the term of this patent is extended or adjusted under 35 U.S.C. 154(b) by 74 days.

(21) Appl. No.: 18/363,145

(22) Filed: Aug. 1, 2023

(65) Prior Publication Data

US 2025/0047786 A1 Feb. 6, 2025

(51) Int. Cl.
*H04M 3/493* (2006.01)

(52) U.S. Cl.
CPC .................. *H04M 3/493* (2013.01)

(58) Field of Classification Search
CPC ............. H04M 3/493; H04M 1/72469; H04M 1/72403; H04M 3/42042; H04M 1/2757; H04M 2201/38; H04M 2203/355; H04M 1/656; H04M 1/6505; H04M 2201/34; H04M 19/04; H04M 3/4933; H04M 3/42; H04M 3/538; H04M 3/436; G10L 15/26
See application file for complete search history.

(56) References Cited

U.S. PATENT DOCUMENTS

| | | | | |
|---|---|---|---|---|
| 5,835,571 A * | 11/1998 | Johnson | ................. | H04M 3/42 |
| | | | | 379/93.08 |
| 7,065,188 B1 * | 6/2006 | Mei | ........................ | G10L 15/22 |
| | | | | 704/E15.04 |
| 7,317,789 B2 * | 1/2008 | Comerford | ........... | H04M 3/493 |
| | | | | 704/270.1 |
| 7,515,695 B1 | 4/2009 | Chan et al. | | |
| 7,983,401 B1 * | 7/2011 | Krinsky | ................ | H04M 3/527 |
| | | | | 455/466 |
| 8,661,112 B2 * | 2/2014 | Creamer | ............... | H04M 3/493 |
| | | | | 379/88.16 |
| 9,172,805 B1 | 10/2015 | Jayapalan et al. | | |
| 9,374,464 B1 | 6/2016 | Demsey | | |
| 9,648,164 B1 * | 5/2017 | Harris | ................. | H04M 3/4365 |
| 10,122,854 B2 | 11/2018 | Chug et al. | | |
| 10,148,818 B1 * | 12/2018 | Koster | ................ | H04M 3/5231 |
| 10,212,283 B1 * | 2/2019 | Gao | ....................... | H04M 3/493 |
| 10,679,248 B1 | 6/2020 | Demsey | | |
| 10,904,643 B2 * | 1/2021 | Gaubitch | ................ | H04M 1/56 |
| 10,944,867 B1 * | 3/2021 | Baror | ...................... | H04M 3/46 |
| 10,979,568 B1 * | 4/2021 | Lu | ....................... | G06F 3/04817 |
| 2004/0037401 A1 * | 2/2004 | Dow | ...................... | H04L 12/66 |
| | | | | 379/88.18 |

(Continued)

OTHER PUBLICATIONS

"Non-Final Office Action", U.S. Appl. No. 18/363,164, May 8, 2025, 12 pages.

*Primary Examiner* — Akelaw Teshale

(74) *Attorney, Agent, or Firm* — FIG. 1 Patents

(57) ABSTRACT

In aspects of interactive telephone system navigation, a media device maintains a record of menu inputs to navigate an interactive telephone menu based on a first call and associates a telephone number of the first call with the record. The media device detects the telephone number initiated for a second call and provides an automated navigation of the interactive telephone menu during the second call.

20 Claims, 6 Drawing Sheets

(56) References Cited

U.S. PATENT DOCUMENTS

| | | | |
|---|---|---|---|
| 2005/0117730 A1 | 6/2005 | Mullis et al. | |
| 2007/0248218 A1* | 10/2007 | Comerford | H04M 3/493 |
| | | | 379/67.1 |
| 2008/0144804 A1* | 6/2008 | Mergen | H04M 3/5166 |
| | | | 379/266.1 |
| 2011/0069828 A1* | 3/2011 | Erhart | H04M 3/5166 |
| | | | 379/245 |
| 2011/0119138 A1* | 5/2011 | Rakers | H04N 21/812 |
| | | | 705/14.72 |
| 2011/0238414 A1 | 9/2011 | Ju et al. | |
| 2015/0078538 A1* | 3/2015 | Jain | H04M 3/493 |
| | | | 379/88.01 |
| 2015/0188959 A1 | 7/2015 | Sayed | |
| 2015/0255063 A1 | 9/2015 | Talwar et al. | |
| 2015/0264175 A1 | 9/2015 | Bumarch, III et al. | |
| 2016/0070533 A1 | 3/2016 | Foster | |
| 2017/0004828 A1 | 1/2017 | Lee et al. | |
| 2018/0234545 A1 | 8/2018 | Barak et al. | |
| 2021/0281682 A1* | 9/2021 | Agarwal | H04W 4/16 |
| 2024/0135011 A1 | 4/2024 | Westlake | |
| 2025/0047787 A1 | 2/2025 | Agrawal et al. | |

\* cited by examiner

INTERACTIVE TELEPHONE SYSTEM NAVIGATION

BACKGROUND

Interactive voice response (IVR) is a technology that allows a computer to interact with humans through the use of voice prompts for a user to enter dual tone multi frequency (DTMF) tones using number keys on a keypad. In telecommunications, IVR allows customers to interact with a company's host system via a telephone keypad, allowing the user to inquire regarding services through the IVR dialogue. IVR systems can respond to user entry with prerecorded or dynamically generated audio to direct users on how to proceed. IVR systems deployed in a network are sized to handle large call volumes and also used for outbound calling.

BRIEF DESCRIPTION OF THE DRAWINGS

Implementations of the techniques for interactive telephone system navigation are described with reference to the following Figures. The same numbers may be used throughout to reference like features and components shown in the Figures.

DETAILED DESCRIPTION

Figure 1:
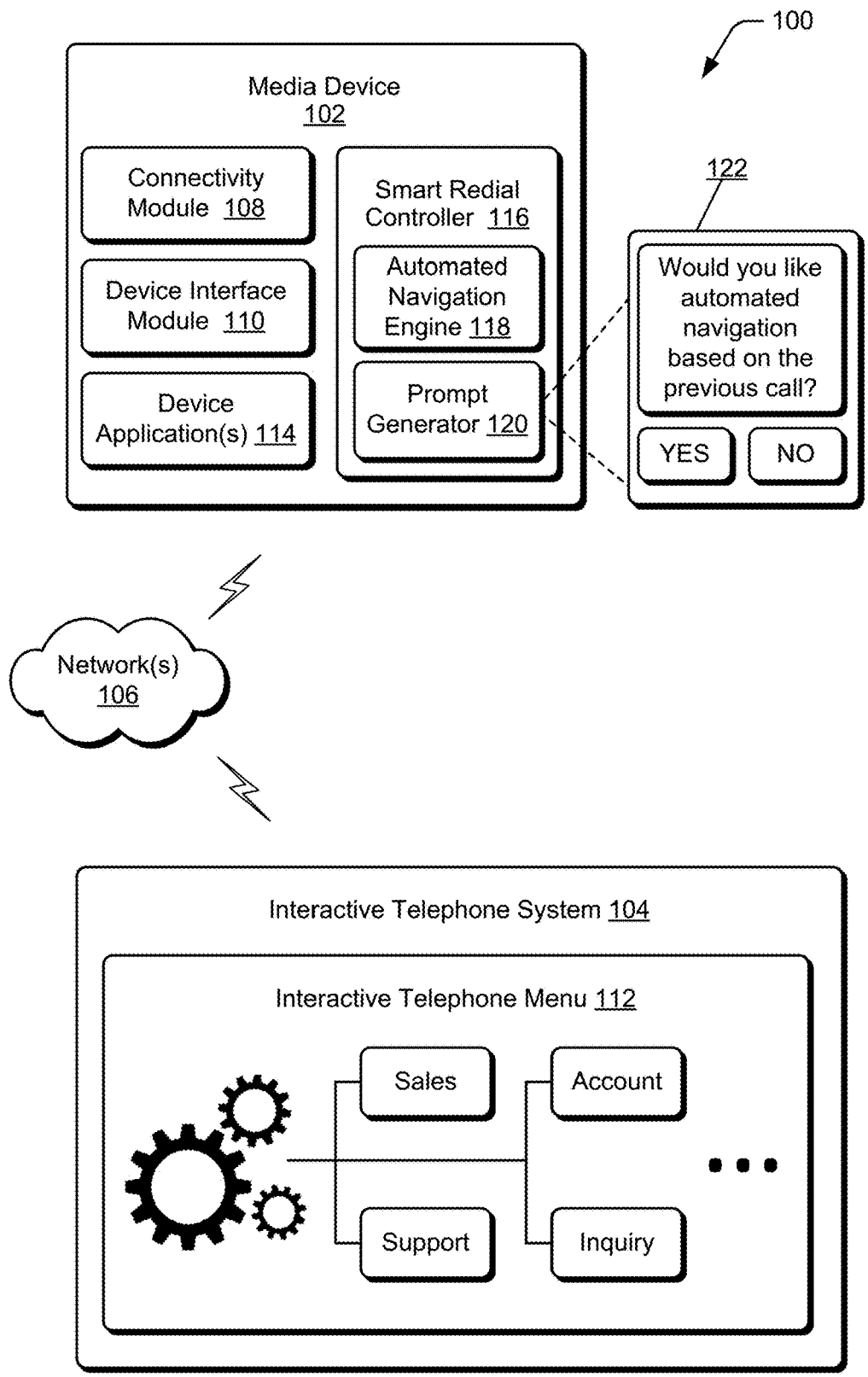
FIG. 1 illustrates an example system for interactive telephone system navigation in accordance with one or more implementations as described herein.

Implementations of the techniques for interactive telephone system navigation may be implemented as described herein. A media device such as any type of a wireless device, mobile device, mobile phone, flip phone, client device, tablet, computing, communication, entertainment, gaming, media playback, and/or any other type of computing and/or electronic device, or a system of any combination of such devices, may be configured to perform techniques for interactive telephone system navigation as described herein. In some cases, at least one media device implements an instantiation of a smart redial controller, providing a shortcut to a particular navigation point of an interactive telephone menu reached during a previous call (e.g., shortcut to a live customer service representative, shortcut to a previously reached live representative of an organization, shortcut to a navigation point for dealing with a particular malfunction of a given product such as a smart phone having a flickering screen, and the like).

To optimize resources and costs, businesses employ interactive telephone systems with interactive telephone menus such as interactive voice response (IVR) systems. In doing so, the businesses can make it nearly impossible for a caller to reach a live customer service representative. The list of options can be layered at such deep levels, that a caller can get frustrated if all the caller wants to do is to reach customer care, which results in a poor user experience. The problem can become further aggravated when the caller has reached customer care, but then the call gets disconnected for some reason and the call has to start all over again through the IVR system.

Existing solutions include redial options such as redialing the customer care number and redialing the customer care number with key presses from a previous call. However, since it is only effective when the key presses are input when prompted at specific points of the interactive telephone menu, such solutions are lacking. Moreover, each interactive telephone system can be different and the menu options may have changed, making it difficult to expect an end user to remember the set of options provided in a previous call.

In aspects of the described techniques, a smart redial controller implements smart redial functionality to enable navigation for a user to a desired point of an interactive telephone menu (e.g., to customer service). In some examples, the smart redial functionality is performed via at least one media device that implements an instantiation of a smart redial controller. In some cases, user input is captured by the at least one media device.

In implementations, the smart redial controller maintains a record of menu inputs that a user provides during a first call, or previous call, as the user navigates an interactive telephone menu. In some cases, the smart redial controller associates a telephone number of the first call with the record of menu inputs provided by the user during the first call. In some examples, the smart redial controller detects the telephone number being dialed for a second call. In various examples, the smart redial controller detects a user entering the telephone number, or alternatively, the smart redial controller detects the user using voice control to dial the telephone number. In some implementations, the smart redial controller provides an automated navigation of the interactive telephone menu during the second call, or subsequent call, based on detecting the telephone number being dialed.

While features and concepts of the described techniques for interactive telephone system navigation is implemented in any number of different media devices, systems, environments, and/or configurations, implementations of the techniques for interactive telephone system navigation are described in the context of the following example devices, systems, and methods.

FIG. 1 illustrates an example system 100 for interactive telephone system navigation, as described herein. The system 100 includes one or more media devices, such as a media device 102, an interactive telephone system 104, and a communication network 106. In the illustrated example, the media device 102 includes a connectivity module 108 and a device interface module 110. As shown, the interactive telephone system 104 includes an interactive telephone menu 112. Examples of media devices include at least one of any type of a wireless device, mobile device, mobile phone, flip phone, client device, companion device, paired device, display device, tablet, computing device, communication device, entertainment device, gaming device, media playback device, any other type of computing and/or electronic device, and/or a system of any combination of such devices.

The media device 102 is implemented with various components, such as a processor system and memory, as well as any number and combination of different components as further described with reference to the example device shown in FIG. 6. In implementations, the media device 102 includes various radios for wireless communication with other devices. In some examples, the media device 102 can include at least one of a BLUETOOTH® (BT) or BLU- ETOOTH® Low Energy (BLE) transceiver, a near field communication (NFC) transceiver, or the like. In some cases, the media device 102 includes at least one of a WI-FI® radio, a cellular radio, a global positioning satellite (GPS) radio, or any available type of device communication interface.

In some implementations, the devices, applications, modules, servers, and/or services described herein communicate via the communication network 106, such as for data communication with the media device 102. The communication network 106 includes a wired and/or a wireless network. The communication network 106 is implemented using any type of network topology and/or communication protocol, and is represented or otherwise implemented as a combination of two or more networks, to include IP-based networks, cellular networks, and/or the Internet. The communication network 106 includes mobile operator networks that are managed by a mobile network operator and/or other network operators, such as a communication service provider, mobile phone provider, and/or Internet service provider.

The media device 102 includes various functionality that enables the device to implement different aspects of interactive telephone system navigation, as described herein. In one or more examples, the connectivity module 108 represents functionality (e.g., logic and/or hardware) enabling the media device 102 to interconnect with other devices and/or networks, such as the communication network 106. For example, the connectivity module 108 enables wireless and/or wired connectivity of the media device 102. The device interface module 110 represents functionality enabling the media device 102 to interface with other devices. As further detailed below, the device interface module 110 enables the media device 102 to establish wireless and/or wired data communication with other devices, such as another media device or similar presentation device.

The media device 102 can include and implement device applications 114, such as any type of messaging application, email application, video communication application, cellular communication application, music/audio application, gaming application, media application, social platform applications, and/or any other of the many possible types of device applications. Many of the device applications 114 have an associated application user interface that is generated and displayed for user interaction and viewing, such as on a display screen of the media device 102. Generally, an application user interface, or any other type of video, image, graphic, and the like is digital image content that is displayable on the display screen of the media device 102.

In the example system 100 for interactive telephone system navigation, the media device 102 is a media device that incorporates smart redial functionality. As shown, the media device 102 implements an instantiation of a smart redial controller 116 (e.g., as a device application 114). As shown, the smart redial controller 116 includes an automated navigation engine 118 and a prompt generator 120. The smart redial controller 116 represents functionality (e.g., logic, software, and/or hardware) enabling implementation of described techniques for interactive telephone system navigation. The smart redial controller 116 can be implemented as computer instructions stored on computer-readable storage media and can be executed by a processor system of the media device 102. Alternatively or in addition, the smart redial controller 116 can be implemented at least partially in hardware of a device.

In one or more implementations, the smart redial controller 116 includes independent processing, memory, and/or logic components functioning as a computing and/or electronic device integrated with the media device 102. Alternatively or in addition, the smart redial controller 116 can be implemented in software, in hardware, or as a combination of software and hardware components. In this example, the smart redial controller 116 is implemented as a software application or module, such as executable software instructions (e.g., computer-executable instructions) that are executable with a processor system of the media device 102 to implement the techniques and features described herein. As a software application or module, the smart redial controller 116 can be stored on computer-readable storage memory (e.g., memory of a device), or in any other suitable memory device or electronic data storage implemented with the module. Alternatively or in addition, the smart redial controller 116 is implemented in firmware and/or at least partially in computer hardware. For example, at least part of the smart redial controller 116 is executable by a computer processor, and/or at least part of the content manager is implemented in logic circuitry.

In one or more implementations, the smart redial controller 116 determines a context for the interactive telephone system 104 associated with a telephone call. In some cases, the smart redial controller 116 uses audio sensors to determine and record user inputs in response to menu options of the interactive telephone menu 112. In some examples, the smart redial controller 116 records device keypad and/or voice inputs provided to the interactive telephone system 104. In some cases, the smart redial controller 116 generates a track record of menu options selected by the user during the interactive telephone system interaction.

When the smart redial controller 116 detects a redial of the telephone number, the smart redial controller 116 provides an option to handle the navigating of the interactive telephone menu 112 based on the inputs the smart redial controller 116 records during the previous call, inserting menu input events (e.g., keypad entries, speech input) as a proxy to reduce the time to reach the desired navigation point of the interactive telephone menu 112 based on the previous call. In some cases, the smart redial controller 116 injects the menu input events at specific intervals after determining the interactive telephone menu 112 is in the input receiving mode. In some examples, the smart redial controller 116 detects non-input points of the interactive telephone menu 112 (e.g., advertisements, introduction provided by the interactive telephone menu 112, etc.) and avoids injecting menu input events during these non-input points.

In the illustrated example, the smart redial controller 116 maintains a record of menu inputs to navigate the interactive telephone menu 112 based on a first call. In some examples, the smart redial controller 116 associates a telephone number of the first call with the record. Thus, in some examples, the record includes at least a telephone number of the first call and one or more menu inputs provided during the first call (e.g., as a user navigates the interactive telephone menu 112). In some cases, the smart redial controller 116 detects the telephone number being initiated, dialed, or requested (e.g., via voice control) for a second call. In response, the smart redial controller 116 provides (e.g., via the automated navigation engine 118) an automated navigation of the interactive telephone menu 112 during the second call.

In some cases, the smart redial controller 116 obtains and maintains the record of menu inputs based on the smart redial controller 116 recording one or more keypad entries during the first call (e.g., keypad entries a user provides during the first call). In some examples, the smart redial controller 116 obtains and maintains the record of menu inputs based on the smart redial controller 116 recording one or more speech inputs during the first call (e.g., speech input a user provides during the first call).

In various examples, the smart redial controller 116 obtains and maintains the record based on the smart redial controller 116 associating a menu input provided during the first call relative to at least one of an elapsed time since a start of the first call and/or a detectable navigation point within the interactive telephone menu 112 during the first call. For example, the smart redial controller 116 detects an initiation of the interactive telephone menu 112 during the first call and determines that a user provides a keypad entry at one (1) minute and ten (10) seconds since the initiation of the interactive telephone menu 112. Accordingly, the smart redial controller 116 stores the keypad entry and the elapsed time one (1) minute and ten (10) seconds in the record. When the smart redial controller 116 detects the elapsed time during a second call to the interactive telephone menu 112, the smart redial controller 116 provides the recorded user input in response to the detected elapsed time.

In some examples, the smart redial controller 116 provides one or more menu inputs during the second call (e.g., at an elapsed time since a start of the second call). In some implementations, the smart redial controller 116 identifies the navigation point of the interactive telephone menu 112 during the second call and provides the menu input at the navigation point within the interactive telephone menu 112 based on the identifying. In some examples, the smart redial controller 116 provides a menu input based on detecting an input receiving mode of the interactive telephone menu 112.

Additionally or alternatively, the smart redial controller 116 records a prompt of the interactive telephone menu 112 and stores a user input (e.g., keypad entry or speech input) relative to the user input. In some cases, the smart redial controller 116 performs analysis on the recorded prompt (e.g., audio analysis). When the smart redial controller 116 detects the prompt during a second call (e.g., based on the analysis on the recorded prompt and real-time audio analysis of the second call), the smart redial controller 116 provides the recorded user input in response to the prompt of the interactive telephone menu 112.

Additionally or alternatively, the smart redial controller 116 performs voice to text analysis on a prompt of the interactive telephone menu 112 during the first call in relation to the user input (e.g., parsing and converting the prompt to text). The smart redial controller 116 then detects the prompt based on performing voice to text analysis during a second call. Based on detecting the prompt, the smart redial controller 116 provides the recorded user input in response to the prompt of the interactive telephone menu 112.

In some cases, the smart redial controller 116 provides, via the automated navigation engine 118, the automated navigation based on the prompt generator 120 providing a prompt (e.g., prompt 122) to accept the automated navigation and receiving a confirmation from the user indicating the user wants the automated navigation. In some cases, the prompt indicates the automated navigation is based on the context of the first call. In various examples, the smart redial controller 116 determines a context of the first call. In some examples, the smart redial controller 116 determines the context based on inputs provided by the user. For example, the smart redial controller 116 determines the context of the first call is regarding a service fee added to a latest bill. Accordingly, the prompt generator 120 prompts the user whether the second call is regarding the service fee added to the latest bill.

Figure 2:
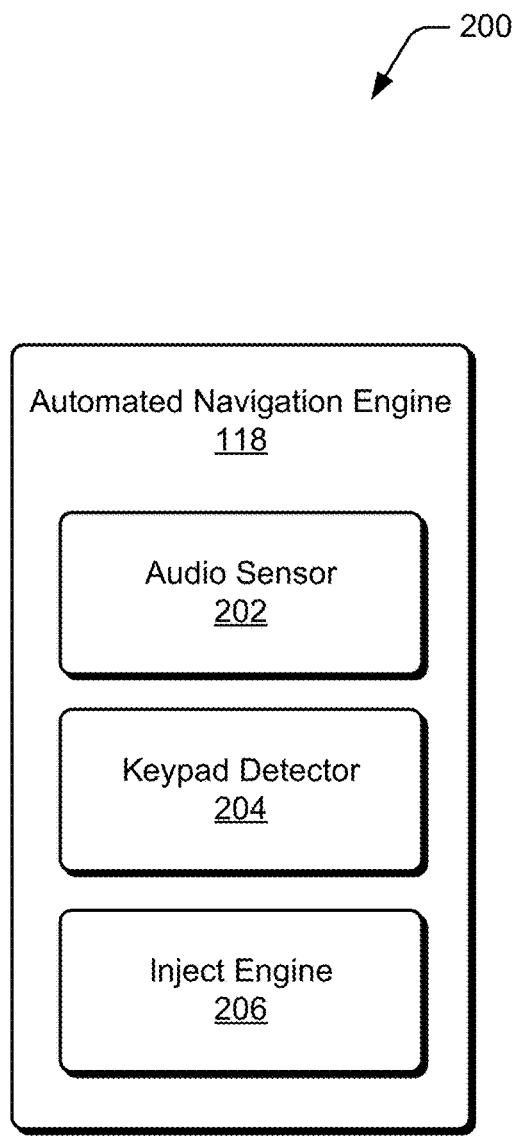
FIG. 2 further illustrates an example of interactive telephone system navigation in accordance with one or more implementations as described herein.

FIG. 2 illustrates example 200 of interactive telephone system navigation, as described herein. As shown, the automated navigation engine 118 includes an audio sensor 202, a keypad detector 204, and an inject engine 206. In some examples, the automated navigation engine 118 enables smart redial functionality associated with interactive telephone menus (e.g., interactive telephone menu 112).

In some examples, the automated navigation engine 118 maintains the record of menu inputs (e.g., one or more speech inputs and/or one or more keypad entries) associated with navigation of an interactive telephone menu during a first call. In some cases, the automated navigation engine 118 maintains the record of menu inputs based on the audio sensor 202 recording one or more speech inputs during the first call. In various examples, the automated navigation engine 118 maintains the record of menu inputs based on the keypad detector 204 recording one or more keypad entries during the first call.

In some implementations, the automated navigation engine 118 provides an automated navigation of the interactive telephone menu during a second call. In some cases, the automated navigation engine 118 provides the automated navigation based on audio sensor 202 recording one or more speech inputs during the first call and/or based on the keypad detector 204 recording one or more keypad entries during the first call.

In some examples, the inject engine 206 identifies one or more navigation points of the interactive telephone menu during the second call relative to one or more menu inputs of the first call (e.g., the one or more keypad entries and/or the one or more speech inputs). In some cases, the inject engine 206 injects or provides the one or more menu inputs at the one or more navigation points while the automated navigation engine 118 traverses the interactive telephone menu based on the inject engine 206 identifying the one or more navigation points. In some examples, the inject engine 206 provides a menu input based on the inject engine 206 detecting an input receiving mode of the interactive telephone menu.

Example methods 300, 400, and 500 are described with reference to respective FIGS. 3, 4, and 5 in accordance with one or more implementations of interactive telephone system navigation, as described herein. Generally, any services, components, modules, managers, controllers, methods, and/or operations described herein can be implemented using software, firmware, hardware (e.g., fixed logic circuitry), manual processing, or any combination thereof. Some operations of the example methods may be described in the general context of executable instructions stored on computer-readable storage memory that is local and/or remote to a computer processing system, and implementations can include software applications, programs, functions, and the like. Alternatively or in addition, any of the functionality described herein can be performed, at least in part, by one or more hardware logic components, such as, and without limitation, Field-programmable Gate Arrays (FPGAs), Application-specific Integrated Circuits (ASICs), Application-specific Standard Products (ASSPs), System-on-a-chip systems (SoCs), Complex Programmable Logic Devices (CPLDs), and the like.

Figure 3:
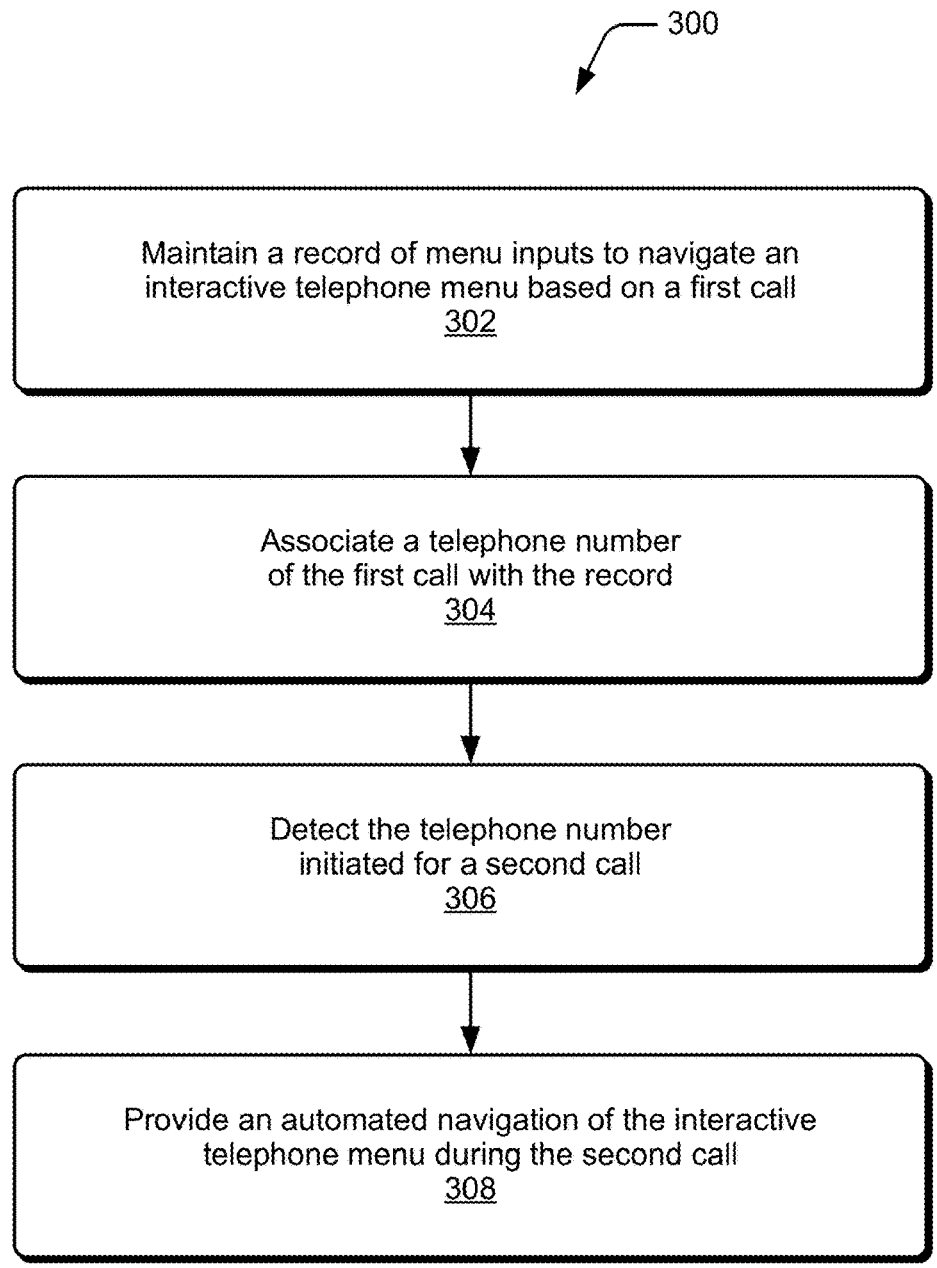
FIGS. 3-5 illustrate example methods for interactive telephone system navigation in accordance with one or more implementations of the techniques described herein.

FIG. 3 illustrates example method(s) 300 for interactive telephone system navigation. The order in which the method is described is not intended to be construed as a limitation, and any number or combination of the described method operations may be performed in any order to perform a method, or an alternate method.

At 302, the method 300 includes maintaining a record of menu inputs to navigate an interactive telephone menu based on a first call. For example, the smart redial controller 116 records menu inputs provided during traversal of an interactive telephone menu of a first call and stores the menu inputs relative to identifiable navigation points of the interactive telephone menu.

At 304, the method 300 includes associating a telephone number of the first call with the record. For example, the smart redial controller 116 determines a telephone number dialed for the first call and stores the telephone number in the record with the recorded menu inputs.

At 306, the method 300 includes detecting the telephone number initiated for a second call. For example, the smart redial controller 116 monitors for telephone numbers being voice dialed or manually dialed (e.g., via a dialing interface of the media device 102) and detects the stored telephone number being dialed.

At 308, the method 300 includes providing an automated navigation of the interactive telephone menu during the second call. For example, the smart redial controller 116 provides automated navigation of the interactive telephone menu based on detection of the telephone number being dialed. In some cases, the smart redial controller 116 prompts the user to confirm that the user wants the automated navigation to be provided.

Figure 4:
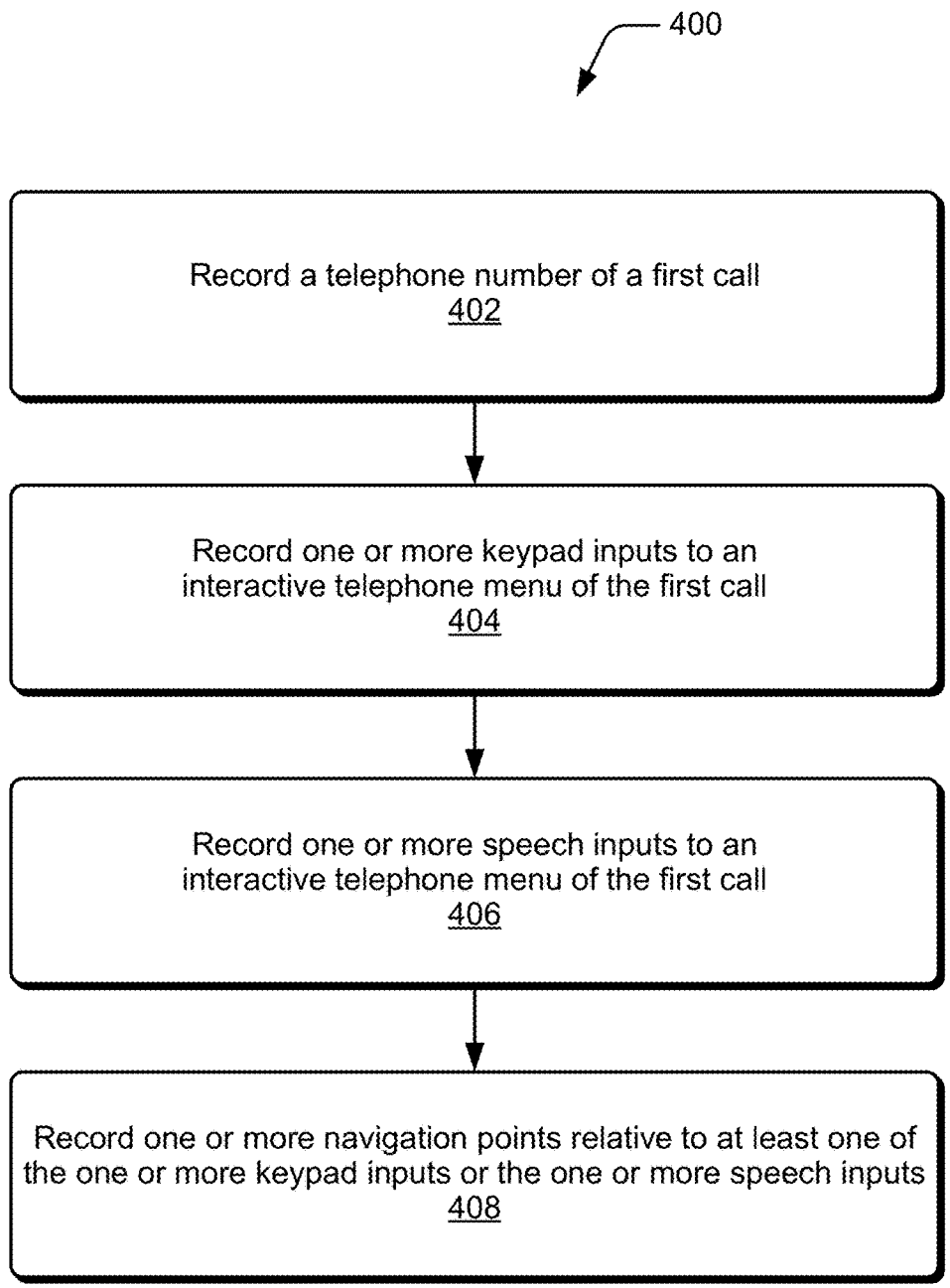

FIG. 4 illustrates example method(s) 400 for interactive telephone system navigation. The order in which the method is described is not intended to be construed as a limitation, and any number or combination of the described method operations may be performed in any order to perform a method, or an alternate method.

At 402, the method 400 includes recording a telephone number of a first call. For example, the smart redial controller 116 determines that a traversal of an interactive telephone menu occurs during the first call and stores the telephone number in a record. In example implementations, the smart redial controller 116 determines a context associated with the first call. In some cases, the smart redial controller 116 determines the context based on audio provided by the interactive telephone menu and/or menu inputs provided by a user during the first call.

At 404, the method 400 includes recording one or more keypad inputs to an interactive telephone menu of the first call. For example, the smart redial controller 116 monitors for keypad inputs during the first call. Upon detecting a first keypad input, the smart redial controller 116 records the detected keypad input in the record. Upon detecting a second keypad input, the smart redial controller 116 records the second keypad input in the record.

At 406, the method 400 includes recording one or more speech inputs to an interactive telephone menu of the first call. For example, the smart redial controller 116 monitors for speech inputs during the first call. Upon detecting a first speech input, the smart redial controller 116 records the first speech input in the record. Upon detecting a second speech input, the smart redial controller 116 records the second speech input in the record.

At 408, the method 400 includes recording one or more navigation points relative to one or more menu inputs (e.g., one or more keypad inputs and/or one or more speech inputs). For example, the smart redial controller 116 associates a first navigation point of the interactive telephone menu with a first menu input that is provided at the first navigation point and associates a second navigation point of the interactive telephone menu with a second menu input that is provided at the second navigation point. In some cases, the smart redial controller 116 stores the first menu input, the first navigation point, the second menu input, and the second navigation point in the record. In various examples, the smart redial controller 116 stores an association of the first menu input with the first navigation point, and an association of the second menu input with the second navigation point in the record.

Figure 5:
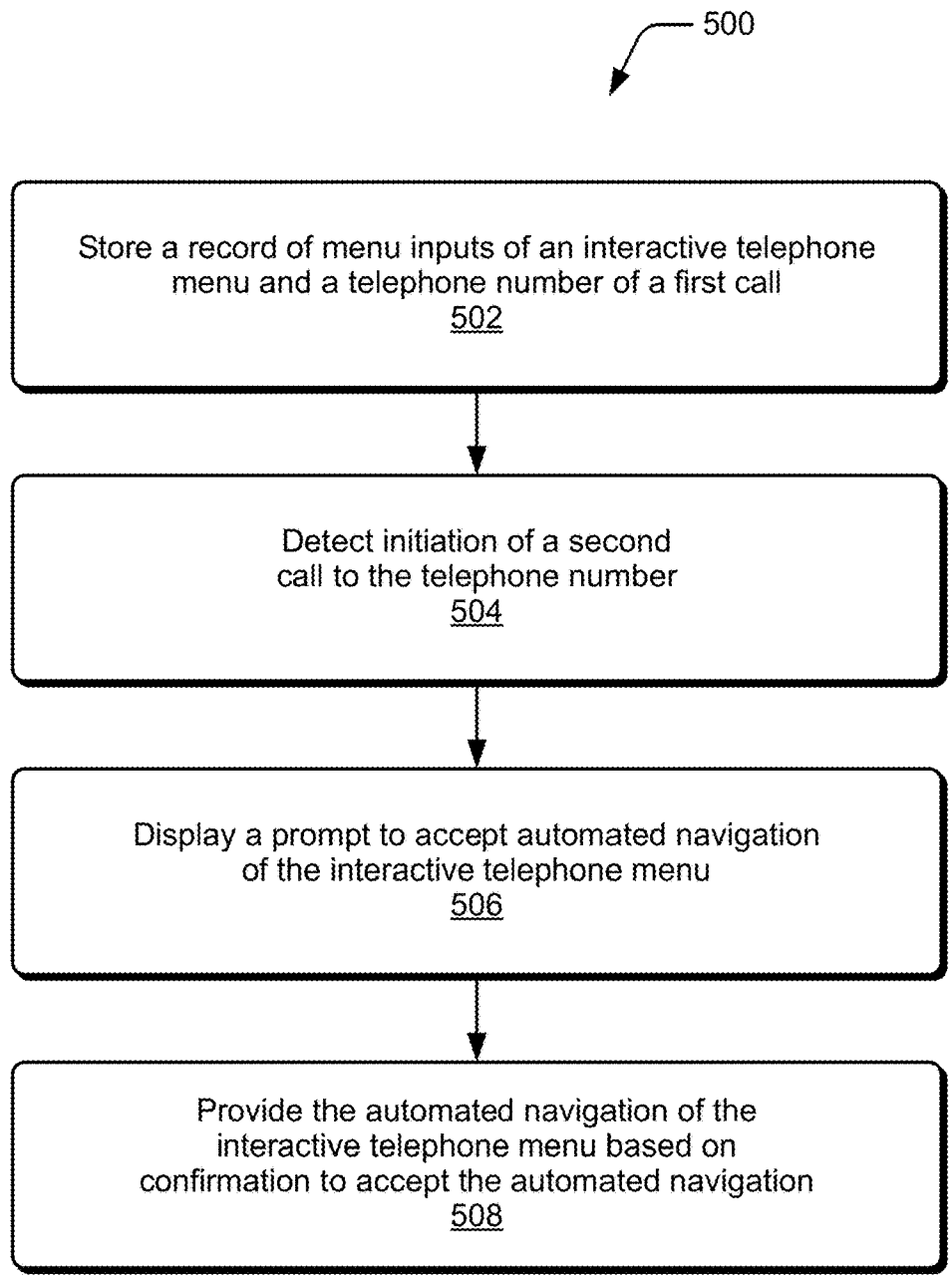

FIG. 5 illustrates example method(s) 500 for interactive telephone system navigation. The order in which the method is described is not intended to be construed as a limitation, and any number or combination of the described method operations may be performed in any order to perform a method, or an alternate method.

At 502, the method 500 includes storing a record of menu inputs of an interactive telephone menu and a telephone number of a first call. For example, the smart redial controller 116 monitors for telephone calls associated with interactive telephone systems. Based on the monitoring, the smart redial controller 116 identifies a first call that includes interactive telephone menu. Accordingly, the smart redial controller 116 records the telephone number with menu inputs of the interactive telephone menu provided by a user during the first call.

At 504, the method 500 includes detecting initiation of a second call to the telephone number. In some examples, the smart redial controller 116 monitors for telephone calls after the first call and detects a second phone call based on the monitoring. The smart redial controller 116 determines that the second phone call is to the telephone number associated with the first call.

At 506, the method 500 includes displaying a prompt to accept automated navigation of the interactive telephone menu. For example, the smart redial controller 116 displays a prompt offering to provide automated navigation of the interactive telephone menu based on the record of menu inputs of the first call.

At 508, the method 500 includes providing the automated navigation of the interactive telephone menu based on confirmation to accept the automated navigation. For example, the smart redial controller 116 monitors for user input after providing the prompt. Upon receiving confirmation that the user accepts the automated navigation of the interactive telephone menu, the smart redial controller 116 navigates the interactive telephone menu during the second call based on the record of menu inputs of the first call.

Figure 6:
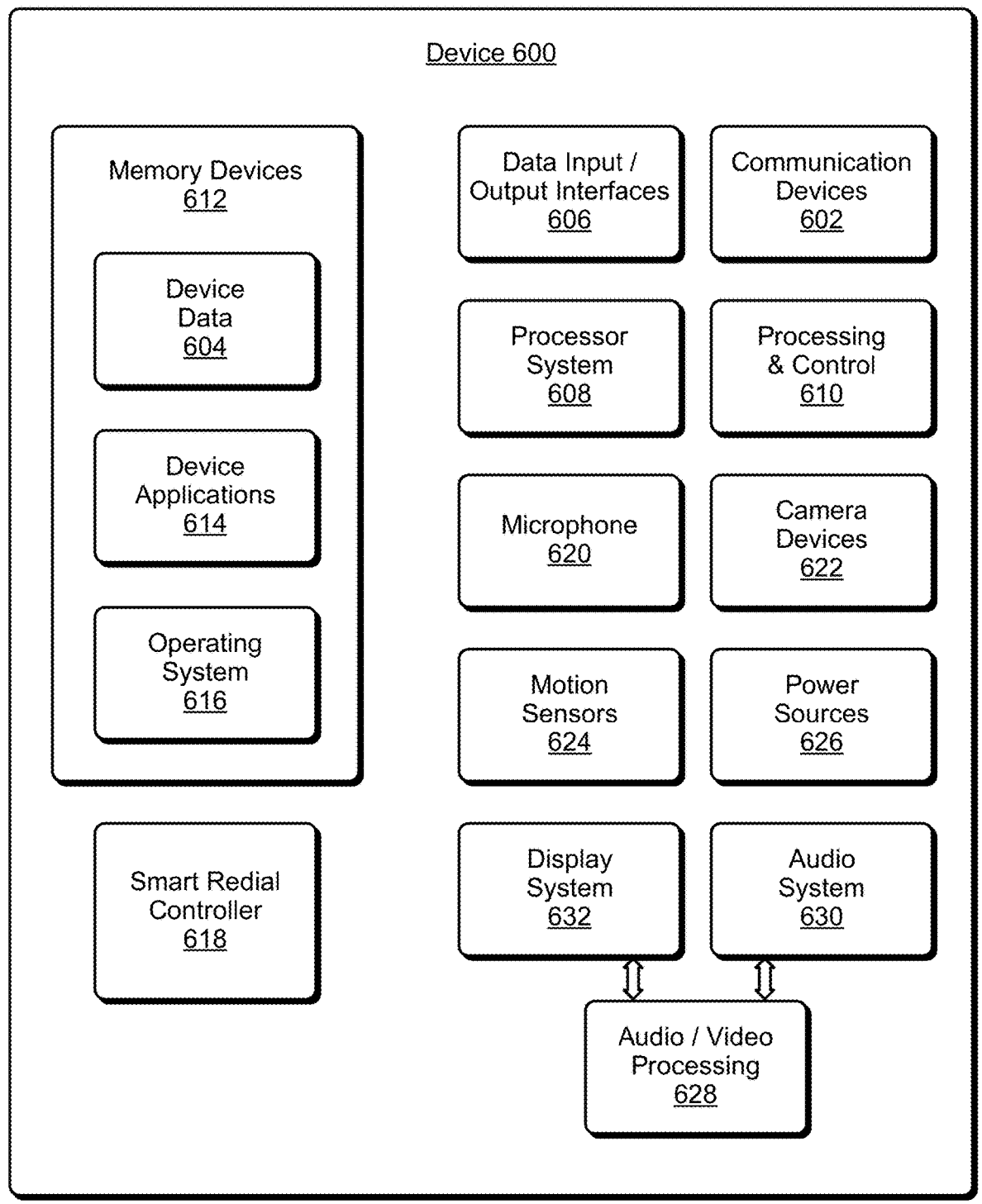
FIG. 6 illustrates various components of an example device that may be used to implement the techniques for interactive telephone system navigation as described herein.

FIG. 6 illustrates various components of an example device 600, which can implement aspects of the techniques and features for interactive telephone system navigation, as described herein. The example device 600 may be implemented as any of the devices described with reference to the previous FIGS. 1-5, such as any type of a wireless device, mobile device, mobile phone, flip phone, client device, companion device, paired device, display device, tablet, computing, communication, entertainment, gaming, media playback, and/or any other type of computing and/or electronic device. For example, the media device 102 described with reference to FIGS. 1-5 may be implemented as the example device 600.

The example device 600 can include various, different communication devices 602 that enable wired and/or wireless communication of device data 604 with other devices. The device data 604 can include any of the various devices data and content that is generated, processed, determined, received, stored, and/or communicated from one computing device to another. Generally, the device data 604 can include any form of audio, video, image, graphics, and/or electronic data that is generated by applications executing on a device. The communication devices 602 can also include transceivers for cellular phone communication and/or for any type of network data communication.

The example device 600 can also include various, different types of data input/output (I/O) interfaces 606, such as data network interfaces that provide connection and/or communication links between the devices, data networks, and other devices. The I/O interfaces 606 may be used to couple the device to any type of components, peripherals, and/or accessory devices, such as a computer input device that may be integrated with the example device 600. The I/O interfaces 606 may also include data input ports via which any type of data, information, media content, communications, messages, and/or inputs may be received, such as user inputs to the device, as well as any type of audio, video, image, graphics, and/or electronic data received from any content and/or data source.

The example device 600 includes a processor system 608 of one or more processors (e.g., any of microprocessors, controllers, and the like) and/or a processor and memory system implemented as a system-on-chip (SoC) that processes computer-executable instructions. The processor system 608 may be implemented at least partially in computer hardware, which can include components of an integrated circuit or on-chip system, an application-specific integrated circuit (ASIC), a field-programmable gate array (FPGA), a complex programmable logic device (CPLD), and other implementations in silicon and/or other hardware. Alternatively, or in addition, the device may be implemented with any one or combination of software, hardware, firmware, or fixed logic circuitry that may be implemented in connection with processing and control circuits, which are generally identified at 610. The example device 600 may also include any type of a system bus or other data and command transfer system that couples the various components within the device. A system bus can include any one or combination of different bus structures and architectures, as well as control and data lines.

The example device 600 also includes memory and/or memory devices 612 (e.g., computer-readable storage memory) that enable data storage, such as data storage devices implemented in hardware which may be accessed by a computing device, and that provide persistent storage of data and executable instructions (e.g., software applications, programs, functions, and the like). Examples of the memory devices 612 include volatile memory and non-volatile memory, fixed and removable media devices, and any suitable memory device or electronic data storage that maintains data for computing device access. The memory devices 612 can include various implementations of random-access memory (RAM), read-only memory (ROM), flash memory, and other types of storage media in various memory device configurations. The example device 600 may also include a mass storage media device.

The memory devices 612 (e.g., as computer-readable storage memory) provide data storage mechanisms, such as to store the device data 604, other types of information and/or electronic data, and various device applications 614 (e.g., software applications and/or modules). For example, an operating system 616 may be maintained as software instructions with a memory device 612 and executed by the processor system 608 as a software application. The device applications 614 may also include a device manager, such as any form of a control application, software application, signal-processing and control module, code that is specific to a particular device, a hardware abstraction layer for a particular device, and so on.

In this example, the device 600 includes a smart redial controller 618 that implements various aspects of the described features and techniques described herein. The smart redial controller 618 may be implemented with hardware components and/or in software as one of the device applications 614, such as when the example device 600 is implemented as the media device 102 described with reference to FIGS. 1-5. An example of the smart redial controller 618 is the smart redial controller 116 implemented by the media device 102, such as a software application and/or as hardware components in the media device. In implementations, the smart redial controller 618 may include independent processing, memory, and logic components as a computing and/or electronic device integrated with the example device 600.

The example device 600 can also include a microphone 620 (e.g., to capture an audio recording of a user) and/or camera devices 622 (e.g., to capture video images of the user during a call), as well as motion sensors 624, such as may be implemented as components of an inertial measurement unit (IMU). The motion sensors 624 may be implemented with various sensors, such as a gyroscope, an accelerometer, and/or other types of motion sensors to sense motion of the device. The motion sensors 624 can generate sensor data vectors having three-dimensional parameters (e.g., rotational vectors in x, y, and z-axis coordinates) indicating location, position, acceleration, rotational speed, and/or orientation of the device. The example device 600 can also include one or more power sources 626, such as when the device is implemented as a wireless device and/or mobile device. The power sources may include a charging and/or power system, and may be implemented as a flexible strip battery, a rechargeable battery, a charged super-capacitor, and/or any other type of active or passive power source.

The example device 600 can also include an audio and/or video processing system 628 that generates audio data for an audio system 630 and/or generates display data for a display system 632. The audio system and/or the display system may include any types of devices or modules that generate, process, display, and/or otherwise render audio, video, display, and/or image data. Display data and audio signals may be communicated to an audio component and/or to a display component via any type of audio and/or video connection or data link. In implementations, the audio system and/or the display system are integrated components of the example device 600. Alternatively, the audio system and/or the display system are external, peripheral components to the example device.

Although implementations for interactive telephone system navigation have been described in language specific to features and/or methods, the appended claims are not necessarily limited to the specific features or methods described. Rather, the specific features and methods are disclosed as example implementations for interactive telephone system navigation, and other equivalent features and methods are intended to be within the scope of the appended claims. Further, various different examples are described, and it is to be appreciated that each described example may be implemented independently or in connection with one or more other described examples. Additional aspects of the techniques, features, and/or methods discussed herein relate to one or more of the following:

A method comprising: maintaining a record of menu inputs to navigate an interactive telephone menu based on a first call; associating a telephone number of the first call with the record; detecting the telephone number initiated for a second call; and providing an automated navigation of the interactive telephone menu during the second call.

Alternatively, or in addition to the above-described method, any one or combination of: maintaining the record of menu inputs includes recording one or more keypad entries during the first call. Maintaining the record of menu inputs includes recording one or more speech inputs during the first call. Maintaining the record includes associating a menu input provided during the first call relative to at least one of an elapsed time since a start of the first call or a navigation point within the interactive telephone menu during the first call. Providing the automated navigation includes providing the menu input at the elapsed time since a start of the second call. Providing the automated navigation includes: identifying the navigation point of the interactive telephone menu during the second call; and providing the menu input at the navigation point within the interactive telephone menu based on the identifying the navigation point. Further including providing a menu input based on detecting an input receiving mode of the interactive telephone menu. Providing the automated navigation is based on providing a prompt to accept the automated navigation and receiving a confirmation. Further including determining a context of the first call, wherein the prompt indicates the automated navigation is based on the context of the first call.

A media device, comprising: a memory to maintain a record of menu inputs to navigate an interactive telephone menu based on a first call; and a processor coupled with the memory, the processor configured to cause the media device to: associate a telephone number of the first call with the record; detect the telephone number initiated for a second call; and provide an automated navigation of the interactive telephone menu during the second call.

Alternatively, or in addition to the above-described media device, any one or combination of: the processor further causes the media device to record one or more keypad entries during the first call. The processor further causes the media device to record one or more speech inputs during the first call. The processor further causes the media device to associate a menu input provided during the first call relative to at least one of an elapsed time since a start of the first call or a navigation point within the interactive telephone menu during the first call. The processor further causes the media device to provide the menu input at the elapsed time since a start of the second call. The processor further causes the media device to: identify the navigation point of the interactive telephone menu during the second call; and provide the menu input at the navigation point within the interactive telephone menu based on identification of the navigation point and a detection of an input receiving mode of the interactive telephone menu. To provide the automated navigation is based on the processor being configured to cause the media device to: determine a context of the first call; and receive a confirmation in response to a prompt to accept the automated navigation, wherein the prompt indicates the automated navigation is based on the context of the first call.

A non-transitory computer-readable medium storing code, the code comprising instructions executable by a processor of a media device to: maintain a record of menu inputs to navigate an interactive telephone menu based on a first call; associate a telephone number of the first call with the record; detect the telephone number initiated for a second call; and provide an automated navigation of the interactive telephone menu during the second call.

Alternatively, or in addition to the above-described media device, any one or combination of: the code includes the instructions further executable by the processor to record one or more keypad entries during the first call. The code includes the instructions further executable by the processor to record one or more speech inputs during the first call. The code includes the instructions further executable by the processor to associate a menu input provided during the first call relative to at least one of an elapsed time since a start of the first call or a navigation point within the interactive telephone menu during the first call.

The invention claimed is:

1. A method, comprising:
    monitoring a first call by recording menu inputs to navigate an interactive telephone menu based on the first call;
    maintaining a record of the menu inputs to navigate the interactive telephone menu based on the first call and associating a telephone number of the first call with the record by associating a menu input provided during the first call relative to a navigation point within the interactive telephone menu during the first call;
    detecting a second call initiated to the telephone number involving the interactive telephone menu;
    identifying the navigation point of the interactive telephone menu during the second call; and
    automatically navigating the interactive telephone menu by outputting information including the menu inputs during the second call based on the record of the menu inputs and providing the menu input at the navigation point within the interactive telephone menu based on identifying the navigation point.

2. The method of claim 1, wherein maintaining the record of the menu inputs includes recording one or more keypad entries during the first call.

3. The method of claim 1, wherein maintaining the record of the menu inputs includes recording one or more speech inputs during the first call.

4. The method of claim 1, wherein automatically navigating the interactive telephone menu includes providing the menu input at an elapsed time since a start of the second call.

5. The method of claim 1, further comprising providing a menu input based on detecting an input receiving mode of the interactive telephone menu.

6. The method of claim 1, wherein automatically navigating the interactive telephone menu is based on providing a prompt to accept the information including the menu inputs and receiving a confirmation.

7. The method of claim 6, further comprising determining a context of the first call, wherein the prompt indicates the information including the menu inputs is based on the context of the first call.

8. The method of claim 1, wherein associating the menu input provided during the first call relative to the navigation point within the interactive telephone menu during the first call involves identifying navigation points of the interactive telephone menu that are associated with the menu inputs.

9. The method of claim 1, wherein the menu inputs indicate an elapsed time between inputs individual inputs.

10. A media device, comprising:
    a memory to maintain a record of menu inputs monitored from a first call involving navigating an interactive telephone menu during the first call;
    one or more sensors to record the menu inputs; and
    a processor coupled with the memory, the processor configured to cause the media device to:

associate a telephone number of the first call with the record by associating a menu input provided during the first call relative to a navigation point within the interactive telephone menu during the first call;

detect a second call initiated to the telephone number involving the interactive telephone menu;

identify the navigation point of the interactive telephone menu during the second call; and automatically navigate the interactive telephone menu by outputting information including the menu inputs during the second call based on the record of the menu inputs and providing the menu input at the navigation point within the interactive telephone menu based on identifying the navigation point.

11. The media device of claim 10, wherein the processor further causes the media device to record one or more keypad entries during the first call.

12. The media device of claim 10, wherein the processor further causes the media device to provide the menu input at an elapsed time since a start of the second call.

13. The media device of claim 10, wherein the processor further causes the media device to automatically navigate the interactive telephone menu is based on the processor being configured to cause the media device determine a context of the first call.

14. The media device of claim 10, wherein associating the menu input provided during the first call relative to the navigation point within the interactive telephone menu during the first call includes recording one or more speech inputs during the first call.

15. The media device of claim 10, the processor further configured to cause the media device to provide a menu input based on detecting an input receiving mode of the interactive telephone menu.

16. The media device of claim 10, wherein to automatically navigate the interactive telephone menu is based on providing a prompt to accept the information including the menu inputs and receiving a confirmation.

17. The media device of claim 16, the processor further configured to cause the media device to determine a context of the first call, wherein the prompt indicates the information including the menu inputs is based on the context of the first call.

18. A non-transitory computer-readable medium storing code, the code comprising instructions executable by a processor of a media device to:

monitor a first call by recording menu inputs to navigate an interactive telephone menu based on the first call;

maintain a record of the menu inputs to navigate the interactive telephone menu based on the first call and associate a telephone number of the first call with the record by associating a menu input provided during the first call relative to a navigation point within the interactive telephone menu during the first call;

detect a second call initiated to the telephone number involving the interactive telephone menu;

identify the navigation point of the interactive telephone menu during the second call; and automatically navigate the interactive telephone menu by outputting information including the menu inputs during the second call based on the record of the menu inputs and providing the menu input at the navigation point within the interactive telephone menu based on identifying the navigation point.

19. The non-transitory computer-readable medium of claim 18, wherein the code includes the instructions further executable by the processor to record one or more keypad entries or speech inputs during the first call.

20. The non-transitory computer-readable medium of claim 18, wherein to automatically navigate the interactive telephone menu is based on providing a prompt to accept the information including the menu inputs and receiving a confirmation.

* * * * *